United States Patent
Kazakli et al.

(10) Patent No.: US 12,252,247 B2
(45) Date of Patent: Mar. 18, 2025

(54) GROUND EFFECT FLIGHT VEHICLE

(71) Applicant: SPEEDER SYSTEMS HOLDING B.V., Aalsmeer (NL)

(72) Inventors: Ahmet Erdem Kazakli, Aalsmeer (NL); Tadao Deniz Ozistek, Aalsmeer (NL)

(73) Assignee: Speeder Systems Holding B.V., Aalsmeer (NL)

( * ) Notice: Subject to any disclaimer, the term of this patent is extended or adjusted under 35 U.S.C. 154(b) by 0 days.

(21) Appl. No.: 18/032,470

(22) PCT Filed: Oct. 12, 2021

(86) PCT No.: PCT/NL2021/050618
§ 371 (c)(1),
(2) Date: Apr. 18, 2023

(87) PCT Pub. No.: WO2022/086321
PCT Pub. Date: Apr. 28, 2022

(65) Prior Publication Data
US 2023/0382525 A1  Nov. 30, 2023

(30) Foreign Application Priority Data
Oct. 21, 2020 (NL) ................................. 2026721

(51) Int. Cl.
*B64C 35/00* (2006.01)
*B60V 1/14* (2006.01)
(Continued)

(52) U.S. Cl.
CPC .............. *B64C 35/006* (2013.01); *B60V 1/14* (2013.01); *B64C 29/0025* (2013.01);
(Continued)

(58) Field of Classification Search
CPC ...... B64C 29/0033; B64C 35/006; B60V 1/14
See application file for complete search history.

(56) References Cited

U.S. PATENT DOCUMENTS 3,159,361 A * 12/1964 Weiland ................... B60V 1/14
180/117
3,181,810 A *  5/1965 Olson ................. B64C 29/0033
244/66

(Continued)

FOREIGN PATENT DOCUMENTS

| RU | 2264951 C1 | 11/2005 |
|----|-----------|---------|
| WO | WO 2018/156041 A2 | 8/2018 |

OTHER PUBLICATIONS

International Search Report for PCT/NL2021/050618.

*Primary Examiner* — Tien Q Dinh
*Assistant Examiner* — William L Gmoser
(74) *Attorney, Agent, or Firm* — Kip L. Bodi (57) ABSTRACT

A ground effect flight vehicle comprising,
a fuselage (1), a wing assembly (4, 5), an engine assembly comprising one or more engines or engine sets (6, 7, 8), and a hull (2) for enabling floatation of the vehicle; wherein the wing assembly (4, 5) comprises stabilizer wings (4) and/or the one or more engines (6, 7, 8) are equipped to provide an airflow departing from the engines (6, 7, 8) which is positionable in one of multiple positions, a first position of the multiple positions which is arranged to generate lift for vertical take-off purpose, and a second position of the multiple positions which is for horizontal cruise flight.

8 Claims, 6 Drawing Sheets

(51) Int. Cl.
 *B64C 29/00* (2006.01)
 *B64C 39/12* (2006.01)
 *B64D 27/24* (2024.01)
(52) U.S. Cl.
 CPC .......... *B64C 29/0033* (2013.01); *B64C 39/12* (2013.01); *B64D 27/24* (2013.01); *B64C 35/001* (2013.01)

(56) References Cited

U.S. PATENT DOCUMENTS

| | | | | |
|---|---|---|---|---|
| 5,419,514 | A * | 5/1995 | Ducan | B64C 29/0033 244/23 B |
| 5,520,260 | A * | 5/1996 | Stiegler | B60V 1/14 180/117 |
| 11,724,801 | B2 * | 8/2023 | Baity | B64U 50/32 244/6 |
| 2008/0283673 | A1* | 11/2008 | Yoeli | B64C 29/0033 244/23 A |
| 2010/0301168 | A1* | 12/2010 | Raposo | B64C 27/82 244/171.2 |
| 2010/0314493 | A1* | 12/2010 | Karkow | B64C 35/001 244/105 |
| 2011/0266081 | A1 | 11/2011 | Novikov-Kopp | |
| 2017/0003690 | A1* | 1/2017 | Tanahashi | B64C 29/0033 |
| 2017/0291592 | A1* | 10/2017 | Schulz | B63B 1/322 |
| 2019/0291860 | A1 | 9/2019 | Morgan | |
| 2020/0148354 | A1* | 5/2020 | Morris | B64C 27/28 |
| 2020/0255136 | A1* | 8/2020 | Karem | B64D 7/00 |
| 2021/0394898 | A1* | 12/2021 | Knoll | B64C 11/20 |

* cited by examiner

GROUND EFFECT FLIGHT VEHICLE

This application is a § 371 national phase of International Application No. PCT/NL2021/050618, filed on Oct. 12, 2021, which claims the benefit of Netherlands patent application serial no. 2026721, filed on Oct. 21, 2020, which applications are incorporated by reference in their entireties.

The invention relates to a flight vehicle comprising, a fuselage, a wing assembly, an engine assembly comprising one or more engines, and a hull for enabling floatation of the vehicle.

WO88/00898 teaches an amphibious aircraft combining the functions of a helicopter and an aerodynamic winged hull, which is capable of vertical takeoff and landing (VTOL) and translational flight in and out of ground effect. Ground effect is the phenomenon of air being trapped under a lifting surface during low level flight. As a result of the air cushion created, drag force is reduced and lift is increased with a raise in the overall efficiency of the lifting surface. It is remarked that ground effect vehicles exist already since the sixties of the previous century, and they have proven to be more efficient than aeroplanes.

An example of a ground effect vehicle is provided by U.S. Pat. No. 5,335,742.

In the following disclosure certain abbreviations may be used, which abbreviations have the meanings as provided below:
- VTOL: Vertical Take-off and landing at zero forward speed
- STOL: Short Take-off at low forward speed
- IMO: International Maritime Organisation
- Type A/B: Wing in Ground Effect type as described in IMO rules
- Air cushion: The lift effect of pressurized air being trapped between a vehicle and the ground/fixed surface.
- Cruise mode: The flight mode of the vehicle where more than 50% of the vertical lift is generated by the aerodynamic forces acting on the vehicle wings.
- Hover mode: The flight mode of the vehicle where more than 50% of the vertical lift is generated by the vehicle's propulsion units and/or the air cushion provided below the vehicle.

A disadvantage of the known amphibious flight vehicle of WO88/00898 is that it requires all the features of a helicopter, and additional engines to provide propellant force for cruise flight. The known flight vehicle is therefore less efficient (in terms of energy and space) than an ordinary wing in ground effect (WIG) vehicle because of its rotor system and the large opening on the main wing/fuselage and more complicated, expensive, and difficult to control during flight.

RU2264951C1 teaches a ground-effect craft with a low-wing monoplane, mid-wing monoplane and high-wing monoplane arranged in tandem. Mounted on their outer panels are annular channels equipped with turning units and cantilever propellers for creating vertical and horizontal thrust.

CN110901906 relates to a rotorcraft capable of improving the cruise lift-drag ratio and the cruise speed by utilizing the ground effect principle. The ground effect rotorcraft comprises a fuselage), a rotor system, ground effect wings, side end plates, an empennage, an engine and a transmission and tilting system. The ground-effect wings are symmetrically arranged on the two sides of the fuselage, the side end plates are arranged on the outer sides of the low-effect wings respectively, the empennage is located behind the fuselage, the at least two pairs of rotor systems are symmetrically arranged on the empennage and the side end plates respectively, and the engine is connected with the transmission and tilting system and the rotor systems. The ground effect rotorcraft has a vertical take-off and landing function.

RO132763 relates to a vertical takeoff and landing propulsion system and aircraft, in particular to an aircraft with hybrid or electric drive, to be used for air travel of persons and air transport of goods, without the need of landing runways. The aircraft has a modular propulsion system consisting of three multiple propellers with flow amplifier, where the first fixed propeller is included in a fuselage in the front part of an enclosure provided with two ducts, an upper one and a lower one, communicating with the upper side wing and the lower side wing, respectively, the lower duct being controlled by some louvres which are in vertical position upon takeoff, directing the air jet downwards and are inclined during transition, directing the air jet backwards, where, during horizontal tight, the upper duct is closed by a flap and the lower duct by the louvres.

The closest prior art document US2011/0266081 discloses a wing in ground effect vehicle comprising a fuselage, a wing assembly, an engine assembly comprising one or more engines or engine sets, and a hull for enabling floatation of the vehicle; wherein the wing assembly comprises positionable stabilizer wings and/or the one or more engines are equipped to provide an airflow departing from the engines which is directable in one of multiple directions, a first direction of the multiple directions which is arranged to generate lift for vertical take-off purpose, and a second direction of the multiple directions which is for horizontal cruise flight in and out of ground effect, wherein the vehicle has apertures to enable passing of air propelled by the engine assembly when the airflow departing from one or more engines is directed in the first direction.

US2011/0266061 aims to increase the vehicle's lift by blowing air with the propulsors located on or at the wings. As a benefit the vehicle has VTOL capability. However, at high speeds both the air coming from the front of the wing and from the propulsors will mainly be trapped at the trailing edge of the wing and create a bow-down pitch moment. Since the propulsors are designed to be blowing air under the wings in all positions, this will limit the designed maximum speed of the vehicle. Further the full thrust of the propulsors cannot be dedicated for propelling the vehicle. Some of the available thrust is at all times sacrificed for lift in all positions of the propulsors. In the system of US2011/0266081 there is always an upwards component of the thrust vector, and the resultant thrust vector cannot be horizontal.

It is an object of the invention that the resultant thrust vector can be arranged to be horizontal or that even some downward component can be achieved during flight for small arrangements on the flight (trim) angle.

It is a further object of the invention to provide a less complicated, more efficient, and less expensive, yet easy to control amphibious flight vehicle, that is capable of using ground effect during cruise, and which is capable to generate sufficient power to ascend/descend vertically with no or very low forward speed, during takeoff and landing (VTOL/STOL).

The ground effect vehicle of the invention is provided with the features of one or more of the appended claims.

In a first aspect of the invention the vehicle's apertures to enable passing of air propelled by the engine assembly when the airflow departing from one or more engines is directed in the first direction are closable so as to prevent airflow from a lower side (relatively high pressure area) to an upper side (relatively low pressure area) of the vehicle and to optimize horizontal cruise flight of the vehicle The vehicle of the invention has the capability of take-off/land like a helicopter/flying car but with extended range thanks to the ground effect. The ground effect vehicle of the invention can thus be less expensive, not to mention its lesser weight and lesser carbon-dioxide footprint. The vehicle of the invention can also have a significant cost advantage over the manufacturing and certification cost in comparison with an aircraft since the vehicle of the invention is classified as a marine vehicle.

In one embodiment of the ground effect vehicle of the invention the one or more engines are equipped with a controllable thrust diversion mechanism.

In another embodiment it is possible to apply separately or in combination with the controllable thrust diversion mechanism the feature that the one or more engines are rotatably mounted on one of the fuselage and the wing assembly.

A major advantage of the ground effect vehicle of the invention is that it is able to take-off and land on areas that are above the sea level such as petrol platforms, aircraft carriers or ports. This eliminates the impact forces caused by the waves during take-off and landing, enhancing the vehicle's operational sea state.

In a preferred embodiment the vehicle of the invention can be classified as marine craft/ship and regulated by IMO rules Type A or Type B wing in ground effect vehicle. The vehicle can then fly within the altitude range of IMO rules and land on most terrains that is relatively flat such as water, swamp, grass, ice, snow etc.

It is further preferred that during cruise flight when the stabilizer wings and/or the airflow departing from the one or more engines is directed in the second direction, said second direction of the airflow departing from the one or more engines is tuneable so as to arrange for controlling movement of the vehicle in roll/pitch and yaw directions. This simplifies control of the vehicle tremendously, thus reducing the need for complicated aerodynamic control surfaces.

Preferably the engine assembly comprises two or more engines that are distributed over the wing assembly to allow directional control by differential powering up of said engines.

In one embodiment the engine assembly comprises different types of engines, a first type to meet requirements both for loiter/hover conditions, and a second type sized for forward flight, and a third type in the form of a booster to create an air cushion in an initial stage of take-off.

The vehicle of the invention comprises in another embodiment an aerodynamic fuselage for carrying the cargo/passengers, a hull that can be a monohull with a tunnel or catamaran form, an engine assembly comprising a forward propulsion engine set which is fixed or tilted and located inside the fuselage or on forward wings/canards of the wing assembly, an aft propulsion engine set which is a fixed or tilted type and located on a main wing, and secondary thrusters which can be placed anywhere on the vehicle to control the three-dimensional motions of the vehicle.

The hull carries the fuselage above the water surface/ground when stationary. The hull shape can be a v-hull, stepped hull, catamaran, trimaran, multihull or comprising multiple separate floats. The hull is designed in such a way that when the propulsion sets are blowing air under the vehicle, a complete or partial air cushion is created to hover the vehicle just above the sea surface/ground at zero forward speed or below take-off speed.

The forward propulsion engine set is to be used for maneuvering (roll, pitch, yaw), hover/VTOL/STOL support and as additional booster. The forward propulsion set comprises either one propulsor unit or multiple units including secondary thrusters. The forward propulsion unit can be placed within the fuselage or within the hull or on the forward wings/canards.

The aft propulsion engine set comprises one or more tiltable propulsion engines which act as main thruster and maneuver control. During VTOL, the main thruster engine set is directed downwards for blowing air under the main wings. The main thruster engine set can be directed with an angle to obtain both lift and forward thrust during STOL. The main thruster engine set is set to horizontal during cruise where the lift is created by the wings.

The applied propulsion units can be either ducted fan type, contra-rotating propellers, turbo fan or gas turbine. The propulsion units can be designed as tilted type or fixed type with an additional mechanism (i.e. thrust vectoring nozzle) for directing the thrust. The main propulsion set can also be used as ailerons by separate control of the thrust angle of each unit. The roll and yaw motions are preferably controlled by the main propulsion set.

A secondary thruster can be placed anywhere and in any desired number on the vehicle (i.e. on the canards, main wings, side floats etc.) to control the three-dimensional motion (yaw, pitch, roll) of the vehicle. The secondary thrusters can also be used for creating additional lift or thrust.

Preferably the secondary thruster or thrusters are mounted on the forward wings/canards which are tiltable.

In the foregoing no preference has been made on the type of engine or engines that can be applied with the ground effect vehicle of the invention, thus expressing that the engine or engines can be of any type, including conventional combustion engines or hybrid or hydrogen combustion or other types of engines. The energy efficiency of the ground effect vehicle according to the invention however enables that the engine assembly can be arranged to be electrically powered. The departing The invention will hereinafter be further elucidated with reference to the drawing of an exemplary embodiment of a deskinning apparatus according to the invention that is not limiting as to the appended claims.

In the drawing:

FIGS. 6.1-6.3 show schematically different options to provide the airflow departing from the engines to be positionable in one of multiple positions; and FIGS. 6.4 and 6.5 show the closable apertures to prevent airflow from a lower side to an upper side of the vehicle and to optimize horizontal cruise flight of the vehicle.

Whenever in the figures the same reference numerals are applied, these numerals refer to the same parts.

With reference to the FIGS. 1-5 that are for a large par: self-explanatory, it is shown that the ground effect vehicle of the invention comprises a fuselage 1; a wing assembly 4, 5;

an engine assembly 6, 7, 8 comprising one or more engines; and a hull 2 for enabling floatation of the vehicle. Further there is a float assembly 3 to provide stability during floatation on a water surface. Optionally the ground effect vehicle may also be provided with a wheelset to enable vehicle to land on and depart from solid ground. The wheelset may for instance be integrated with the float assembly 3.

Figure 1:
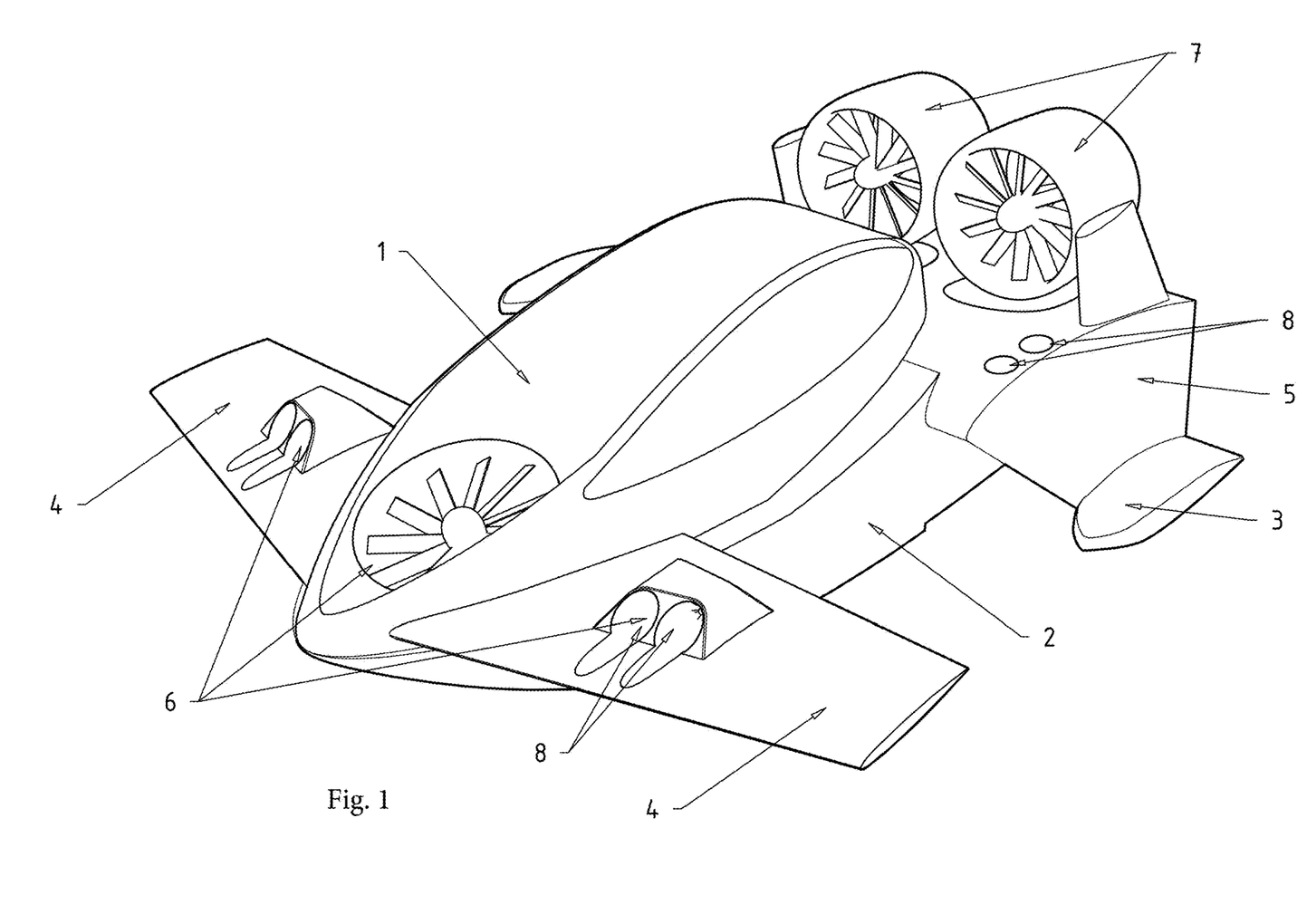
FIG. 1 shows a first embodiment of an ground effect vehicle according to the invention in an isometric view in cruise control mode.
Figure 2:
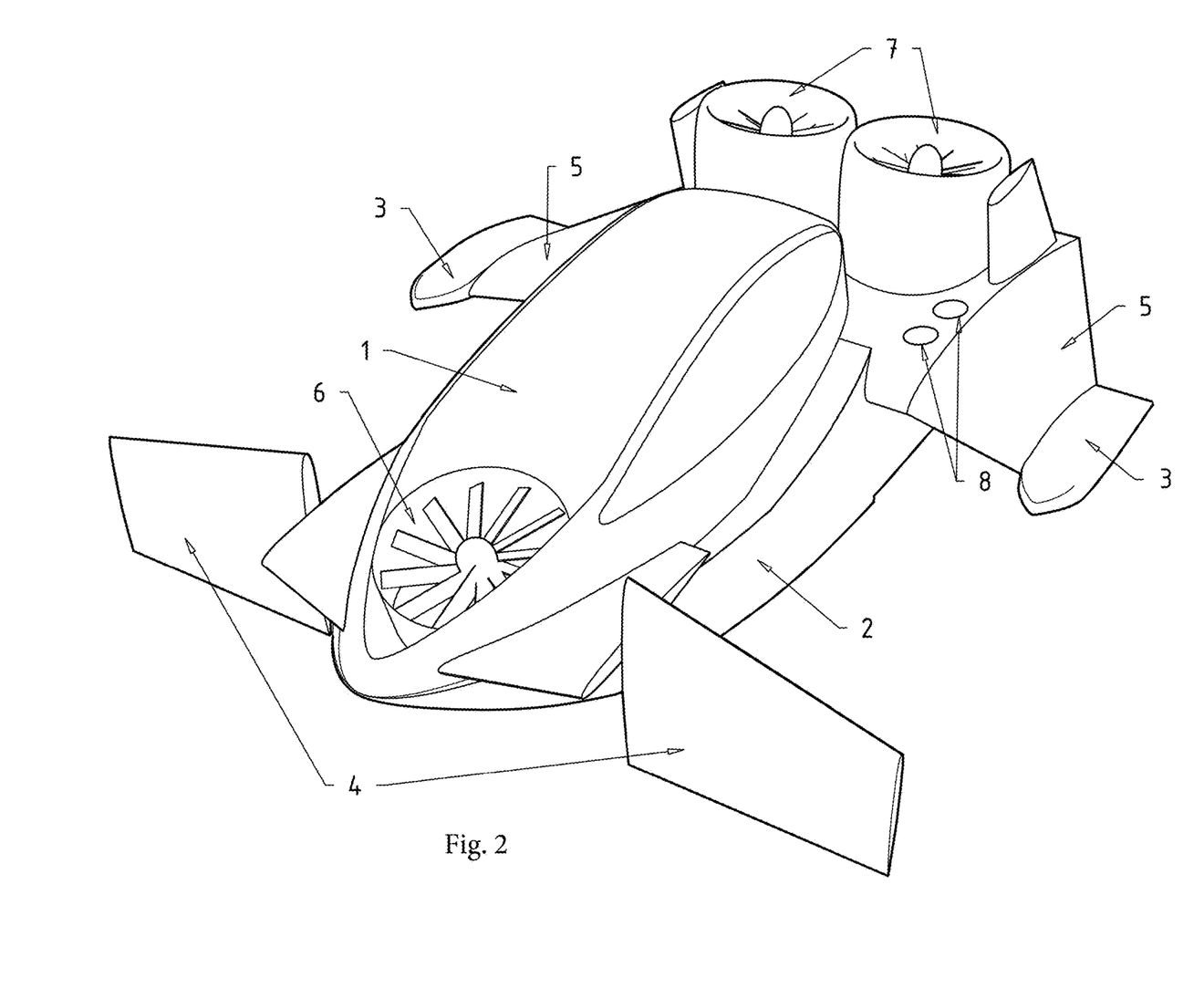
FIG. 2 shows an isometric view the ground effect vehicle of FIG. 1 in VTOL mode.

According to the invention the wing assembly 4, 5 comprises stabilizer wings 4, wherein a comparison between FIG. 1 and FIG. 2 shows that the stabilizer wings 4 are positionable and/or the one or more engines 7 are positionable so as to arrange that the airflow departing from the engines is directable in one of multiple directions. A first position of the engines which results in a corresponding direction of the airflow departing from the engines is best shown in FIG. 2 which is arranged to generate lift for vertical take-off purpose. A second position of the engines and a corresponding direction of the airflow departing from the engines is shown in FIG. 1 which is arranged for horizontal cruise flight. The one or more engines are therefore rotatably mounted on one of the fuselage 1 and the wing assembly, in particular the main wings 5.

Figure 61:
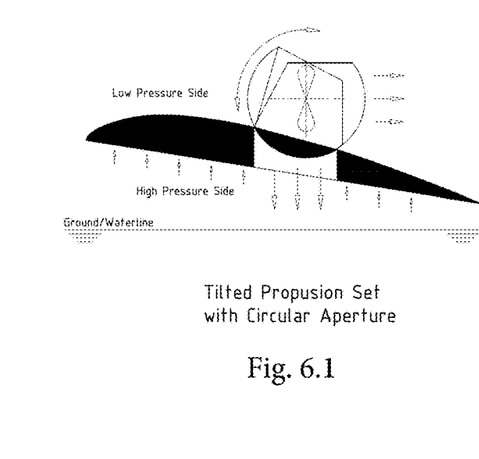
Figure 62:
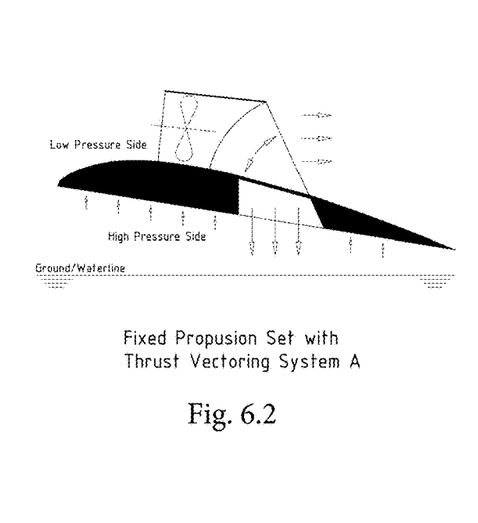
Figure 63:
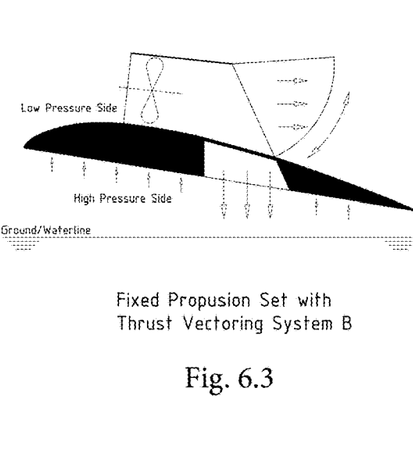

The rotatable mounting of the engines is schematically also shown in FIG. 6.1, depicting also another option to provide that the airflow departing from the engines can be selectively arranged to flow in a desired direction, to note that FIG. 6.2 and FIG. 6.3 show schematically that the one or more engines can be equipped with a controllable thrust diversion mechanism. By suitably controlling this thrust diversion mechanism it is possible to provide an airflow departing from the engines which is directable in one of multiple directions, a first direction of the multiple directions which is arranged to generate lift for vertical take-off purpose, and a second direction of the multiple directions which is for horizontal cruise flight.

Figure 64:
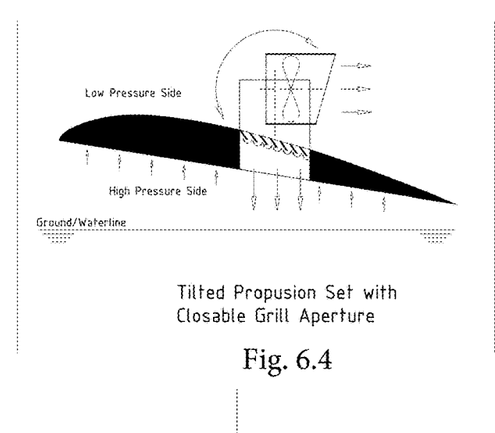
Figure 65:
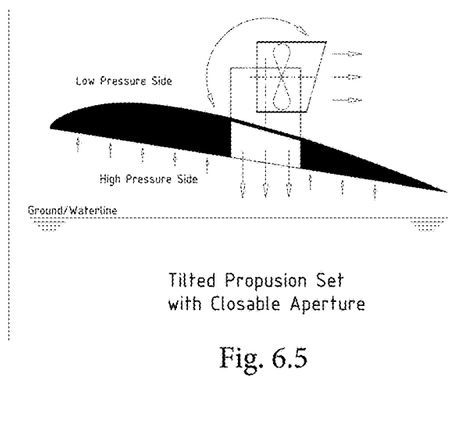

FIG. 6.4 and FIG. 6.5 further show examples of closable apertures to prevent airflow from a lower side to an upper side of the vehicle and to optimize horizontal cruise flight of the vehicle.

Turning back to FIGS. 1-5, it is remarked that during cruise flight when the stabilizer wings 4 and/or the one or more engines 7 are in the second position according to FIG. 1, said second position of the one or more engines 7 is tuneable so as to arrange for controlling movement of the vehicle in roll/pitch and yaw directions.

Figure 3:
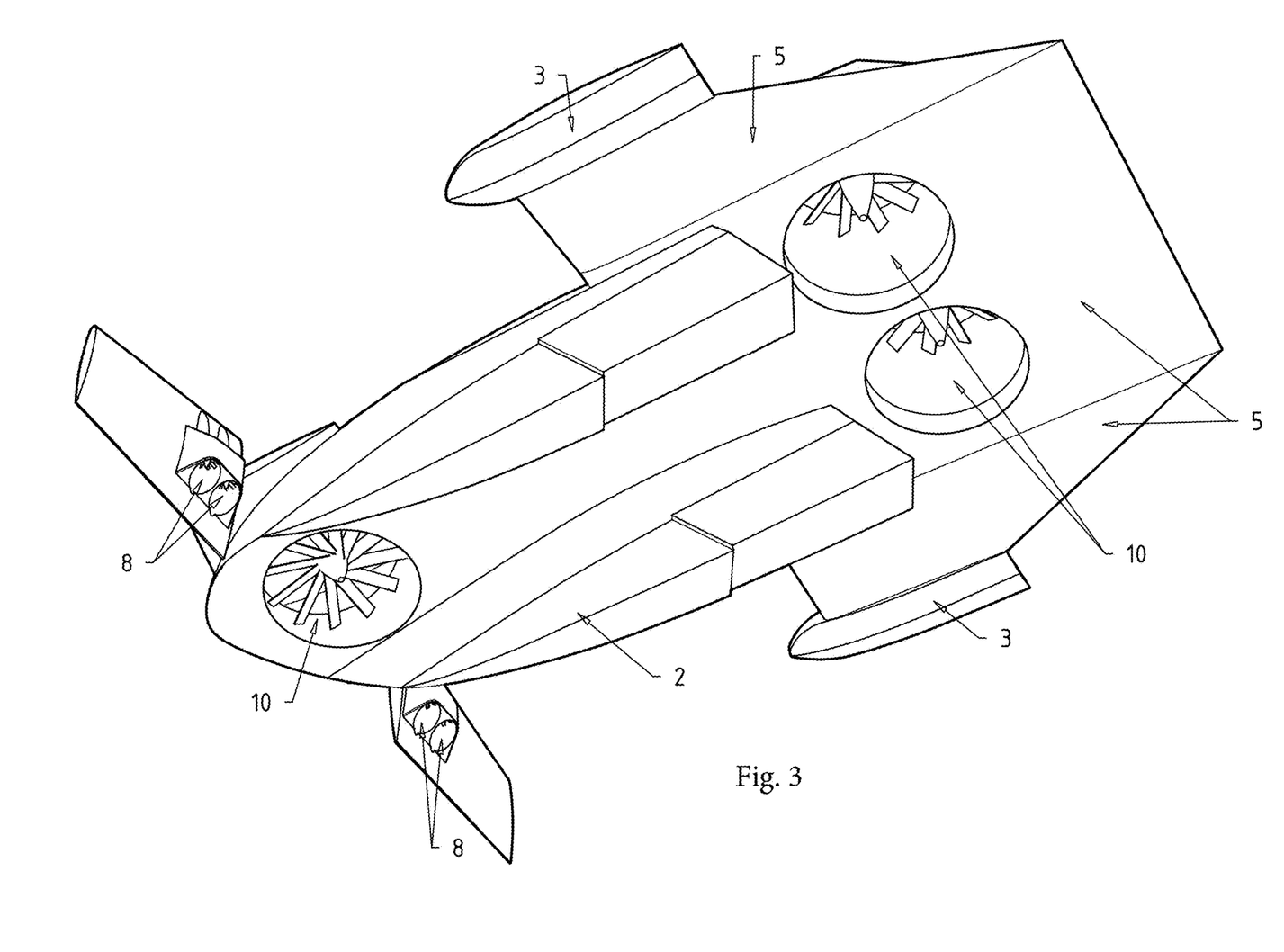
FIG. 3 shows the ground effect vehicle as shown in FIG. 2 with a view at the hull of the vehicle.
Figure 4:
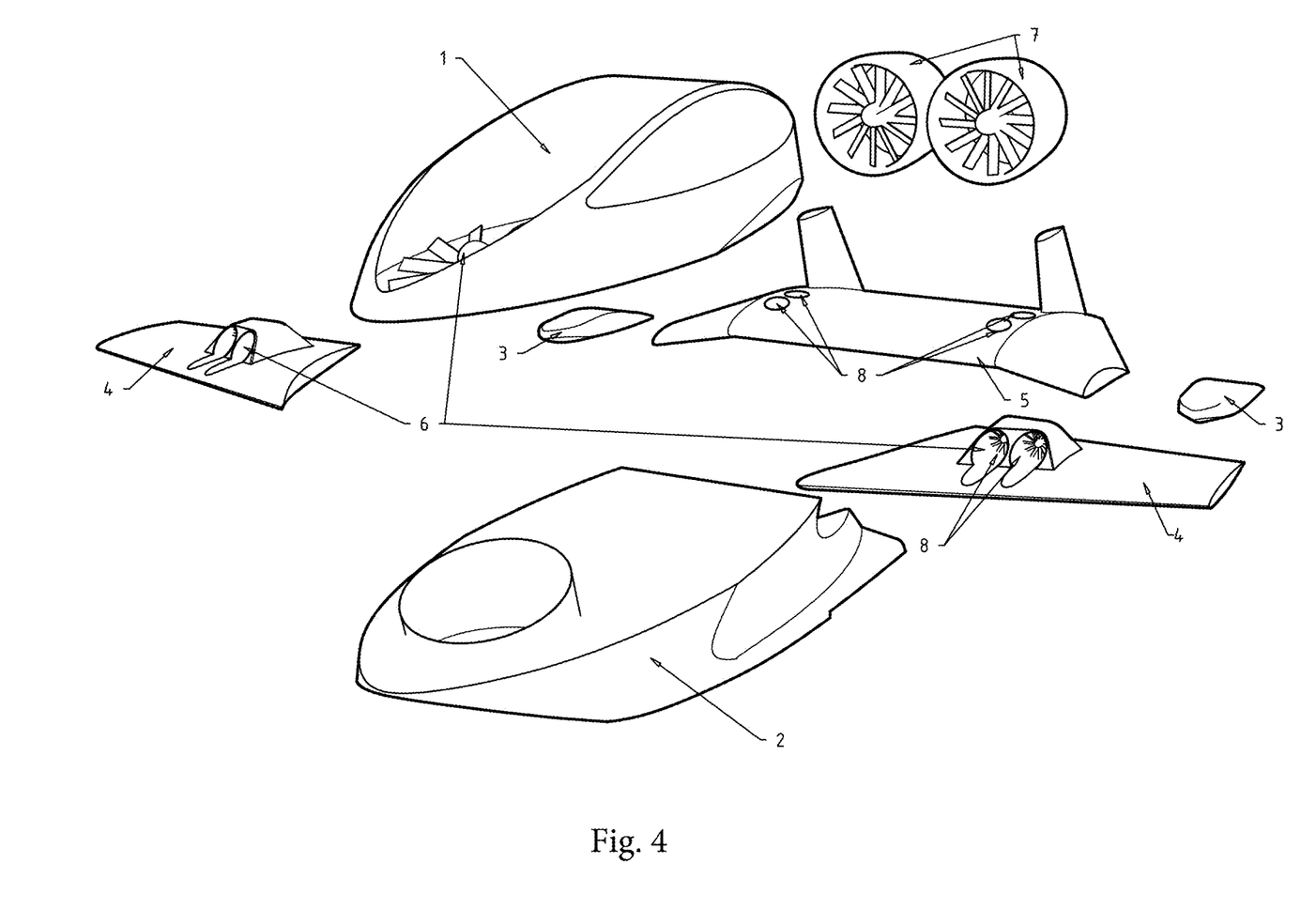
FIG. 4 shows an exploded view of the first embodiment of the ground effect vehicle shown in FIG. 1.

In particular FIG. 3, which is a view from below at the vehicle shown in FIG. 2, clearly shows that the vehicle has apertures 10 to enable passing of air propelled by the engine assembly when the one or more engines 7 are in the first or VTOL position.

It is further desirable that the apertures 10 are closable to avoid undesirable turbulence during cruise flight.

Figure 5:
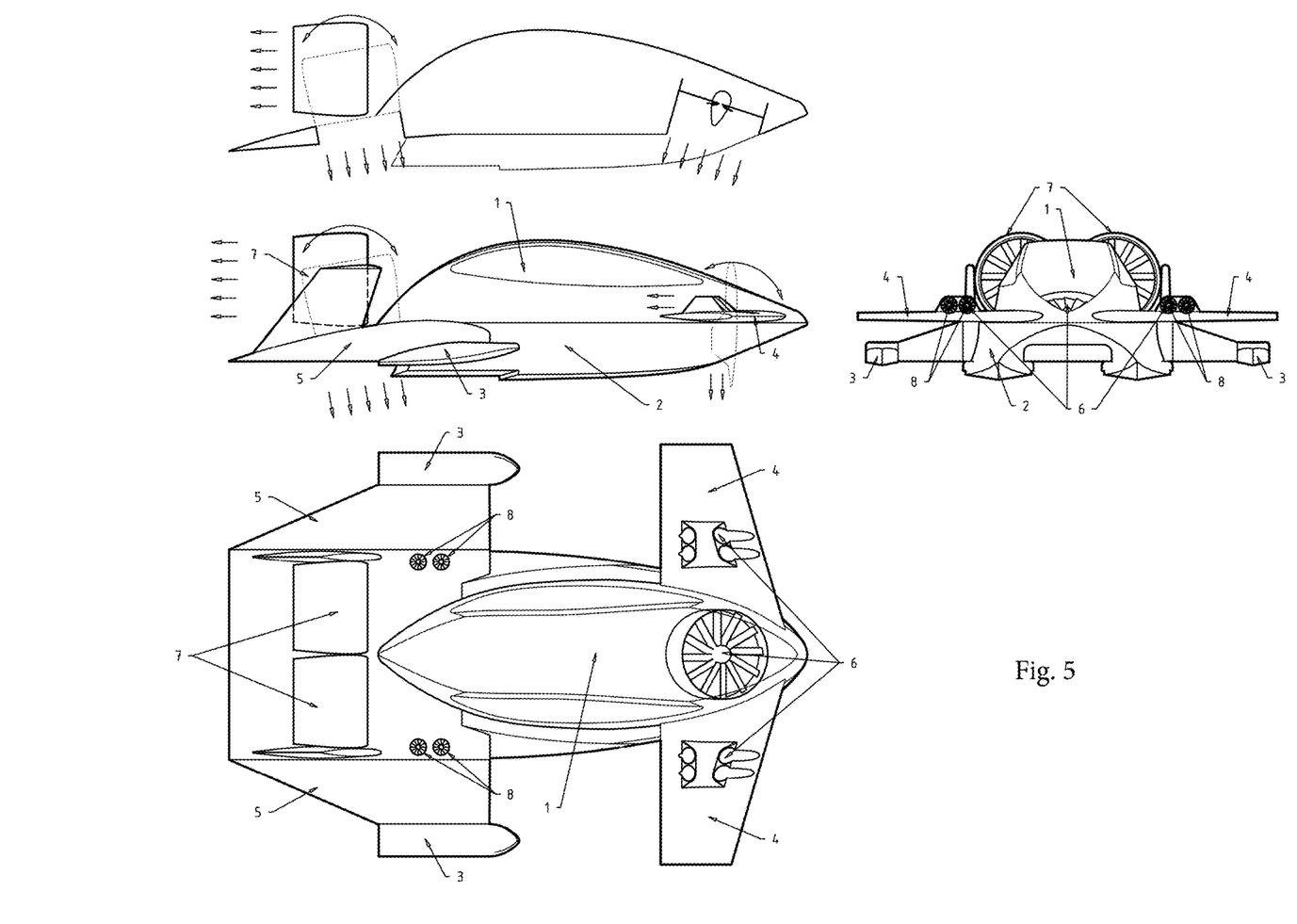
FIG. 5 shows a second embodiment of an ground effect vehicle according to the invention in several views.

Both FIG. 1 and FIG. 5 show that in both embodiments of the ground effect vehicle of the invention the engine assembly comprises two or more engines 6, 7, 8 that are distributed over the wing assembly 4, 5 to allow directional control by differential powering up of said engines 6, 7, 8.

It is further beneficial that the engine assembly 6, 7, 8 comprises different types of engines, a first type to meet requirements both for loiter/hover conditions, i.e. engine 6 and a second type sized for forward flight, i.e. engines 7, and a third type in the form of a booster to create an air cushion in an initial stage of take-off.

The respective figures further show an aerodynamic fuselage 1 for carrying cargo/passengers, a hull 2 and an engine assembly 6, 7, 8 which comprises a forward propulsion engine set 6 which is located inside the fuselage 1 and on forward wings/canards 4 of the wing assembly 4, 5; and an aft propulsion engine set 7 which is located on a main wing 5 of the wing assembly 4, 5, and a secondary thruster or thrusters 8 to control three-dimensional motions of the vehicle. Preferably the secondary thruster or thrusters 8 are mounted on the forward wings/canards 4 which are tiltable.

The hull 2 carries the fuselage 1 above the water surface/ground when stationary. The hull 2 shape can be a v-hull, stepped hull, catamaran, trimaran, multihull or comprising multiple separate floats. The hull 2 is designed in such a way that when the propulsion engine sets 6, 7 are blowing air under the vehicle, a complete or partial air cushion is created to hover the vehicle just above the sea surface/ground at zero forward speed or below take-off speed.

The forward propulsion engine set 6 is arranged for maneuvering (roll, pitch, yaw), for hover/VTOL/STOL support and as additional booster. The secondary thruster or thrusters 8 are placed on a selected one of a group comprising the canards 4, main wings 5, and side floats 3 to control the three-dimensional motion (yaw, pitch, roll) of the vehicle. The aft propulsion engine set 7 comprises one or more tiltable propulsion engines which act as main thruster and maneuver control. During VTOL, the aft propulsion engine set 7 is directed downwards for blowing air under the main wings 5. The aft propulsion engine set 7 can be directed with an angle to obtain both lift and forward thrust during STOL. The aft propulsion engine set 7 is set to horizontal during cruise where the lift is created by the wings 4, 5.

The applied propulsion units can be either ducted fan type, contra-rotating propellers, turbo fan or gas turbine. The propulsion units can be designed as tilted type or fixed type with an additional mechanism (i.e. thrust vectoring nozzle) for directing the thrust. The aft propulsion engine set 7 can also be used as ailerons by separate control of the thrust angle of each unit. The roll and yaw motions are preferably controlled by the aft propulsion engine set 7.

The secondary thruster or thrusters 8 can be placed anywhere and in any desired number on the vehicle (i.e. on the canards, main wings, side floats etc.) to control the three-dimensional motion (yaw, pitch, roll) of the vehicle. The secondary thrusters 8 can also be used for creating additional lift or thrust.

Finally it is remarked that the engine assembly 6, 7, 8 can be arranged to be electrically powered.

Although the invention has been discussed in the foregoing with reference to exemplary embodiments of an ground effect vehicle of the invention, the invention is not restricted to these particular embodiments which can be varied in many ways without departing from the invention. The discussed exemplary embodiments shall therefore not be used to construe the appended claims strictly in accordance therewith. On the contrary the embodiments are merely intended to explain the wording of the appended claims without intent to limit the claims to these exemplary embodiments. The scope of protection of the invention shall therefore be construed in accordance with the appended claims only, wherein a possible ambiguity in the wording of the claims shall be resolved using these exemplary embodiments.

The invention claimed is:

1. A ground effect vehicle, comprising:
   a fuselage;
   a wing assembly comprising a main wing and forward wings;
   a hull for enabling floatation of the vehicle; and an engine assembly equipped to provide an airflow which is directable in one of multiple directions, a first direction of the multiple directions which is arranged to generate lift for vertical take-off purpose, and a second direction of the multiple directions which is for horizontal cruise flight in and out of ground effect, the engine assembly further comprising a forward propulsion set located inside the fuselage or on the forward wings, an aft propulsion set comprising one or more tiltable propulsion engines located on the main wing, and a secondary thruster or thrusters to control three-dimensional motions of the vehicle;

wherein the shape of the hull creates a complete or partial air cushion to hover the vehicle just above the sea surface/ground at zero forward speed or below take-off speed when the propulsion sets are blowing air in the second direction, wherein the complete or partial air cushion is created by the aft propulsion set blowing air under the main wings;

wherein the vehicle further comprises apertures to enable passing of air propelled by one or more tiltable propulsion engines when the airflow departing from the one or more tiltable propulsion engines is directed in the first direction;

wherein during cruise flight when the forward wings and/or the airflow departing from one or more engines is directed in the second direction, said second direction of the airflow departing from one or more engines is tuneable so as to arrange for controlling movement of the vehicle in roll/pitch and yaw directions; and wherein the apertures are closable so as to prevent airflow from a lower side to an upper side of the vehicle so as to optimize horizontal cruise flight of the vehicle.

2. The ground effect vehicle of claim 1, characterized in that the engine assembly is equipped with a controllable thrust diversion mechanism.

3. The ground effect vehicle of claim 1, characterized in that the engine assembly comprises two or more engines that are distributed over the wing assembly to allow directional control by differential powering up of said engines.

4. The ground effect vehicle of claim 1, characterized in that the engine assembly comprises different types of engines, a first type to meet requirements both for loiter/hover conditions, a second type sized for forward flight, and a third type in the form of a booster to create an air cushion in an initial stage of take-off.

5. The ground effect vehicle of claim 1, characterized in that the forward propulsion engine set is arranged for maneuvering (roll, pitch, yaw), for hover/VTOL/STOL support and as additional booster.

6. The ground effect vehicle of claim 1, characterized in that the secondary thruster or thrusters are placed on a selected one of a group comprising the forward wings, main wings, and side floats to control the three-dimensional motion (yaw, pitch, roll) of the vehicle.

7. The ground effect vehicle of claim 6 characterized in that the secondary thruster or thrusters are mounted on the forward wings which are tiltable.

8. The ground effect vehicle of claim 1, characterized in that the engine assembly is electrically powered.

* * * * *